(12) United States Patent
Groover (10) Patent No.: US 7,753,545 B2
(45) Date of Patent: Jul. 13, 2010

(54) ILLUMINATED PLASTIC FUEL TANK

(76) Inventor: Philip Guy Groover, R.R. 4 Box 151A10, Ludowici, GA (US) 31316-9418

( * ) Notice: Subject to any disclaimer, the term of this patent is extended or adjusted under 35 U.S.C. 154(b) by 208 days.

(21) Appl. No.: 11/969,948

(22) Filed: Jan. 7, 2008

(65) Prior Publication Data

US 2008/0247153 A1 Oct. 9, 2008

Related U.S. Application Data (60) Provisional application No. 60/921,772, filed on Apr. 4, 2007.

(51) Int. Cl.
| F21V 33/00 | (2006.01) |
| F21V 5/00 | (2006.01) |
| F21V 9/12 | (2006.01) |
| B67C 3/00 | (2006.01) |
| B60Q 1/00 | (2006.01) |
| G01F 23/00 | (2006.01) |
| B65D 5/66 | (2006.01) |

(52) U.S. Cl. .......... 362/101; 362/96; 362/154; 362/318; 141/231; 340/450.2; 73/293; 116/227; 222/113

(58) Field of Classification Search .......... 362/96, 362/101, 154, 318; 141/231; 340/450.2, 340/618; 73/293; 116/227; 222/113
See application file for complete search history.

(56) References Cited

U.S. PATENT DOCUMENTS

| 2,472,665 A * | 6/1949 | Ladner ............... 340/450.2 |
| 2,577,857 A * | 12/1951 | Parisotto ............... 222/113 |
| 3,792,389 A * | 2/1974 | Murphy ............... 335/205 |
| 3,987,294 A | 10/1976 | Carlson |
| 4,644,790 A | 2/1987 | Mizoguchi |
| 5,165,778 A | 11/1992 | Matthias et al. |
| 5,645,336 A | 7/1997 | Brown et al. |
| 5,842,763 A * | 12/1998 | Lakosky ............... 362/23 |
| 6,676,271 B2 | 1/2004 | Kohn et al. |
| 7,303,301 B2 * | 12/2007 | Koren et al. ............... 362/101 |
| 2004/0089067 A1* | 5/2004 | Frank ............... 73/293 |
| 2006/0225328 A1* | 10/2006 | Hasan ............... 40/570 |

* cited by examiner

*Primary Examiner*—Jacob Y Choi
*Assistant Examiner*—David J Makiya
(74) *Attorney, Agent, or Firm*—F. Rhett Brockington (57) ABSTRACT

The invention is an illuminable tank that includes a partially translucent plastic tank and an illumination apparatus. The illuminable tank enables a user to determine the level of liquid in the tank, to make the tank more visible at night, and to light the area surrounding the tank's mouth and a spout. The illumination apparatus has a magnetic reed switch and an electrical circuit with a plurality of light emitting devices that are directed toward the interior of the tank, therein backlighting the tank and illuminating a visible level line at an interface of a surface of the liquid in the tank and the space above the surface. There can also be external lights which provide a cone of light for the spout. The illumination apparatus is explosion proof, and the illuminable plastic tank can be used to store, carry and dispense all commercial retail fuels.

17 Claims, 7 Drawing Sheets

ILLUMINATED PLASTIC FUEL TANK

CROSS REFERENCE TO RELATED PATENT APPLICATIONS

The application claims the benefit of the priority filing date of the provisional application bearing Ser. No. 60/921,772, which was filed on Apr. 4, 2007.

BACKGROUND OF THE INVENTION

1) Field of the Invention

The invention relates to fuel tanks, and more particularly to an illumination apparatus and an illuminable tank that is a partially translucent tank having a lighted interior that facilitates determining the level of liquid in the tank and an illuminated spout for minimizing spillage.

2) Prior Art

Plastic tanks, particularly those used for storing and conveying fuels (gasoline, kerosene, diesel fuel), are typically brightly colored so that they can be easily seen in daylight. Usually they are color coded, such that gasoline is in a red tank, kerosene is in a yellow tank, and diesel is in a blue tank. The color coding connotes that the contents are hazardous, because the liquid contained, therein is highly flammability, irritating to the skin and lungs, and toxic if ingested. These plastic tanks are normally small portable tanks of less than or equal to 10 gallons, and they are very commonly employed for a variety of applications, to the point that they are ubiquitous. They are used to refuel portable tools (i.e. leaf blowers, chain saws, hedge clippers), larger tools (i.e. lawn mowers, lawn tractors, stump grinders, generators, compressors, large blowers, concrete smoothers, concrete vibrators, high pressure washers, wood splitters, chippers, small hydraulic generators, and the like), small transportation vehicles (ATVs, gasoline engine golf and utility carts, go-carts, jet skis, small boats—Zodiacs and Jon boats), kerosene heaters, lamps, stoves, and as an emergency source of fuel for larger motored applications (cars, trucks, tractors, and other vehicles). In addition to the small tanks, portable plastic tanks, both rigid and collapsible, are available in very large sizes, up to several thousand gallons. The large tanks are used in the storage and distribution of liquids ranging from water to pesticides, and they are typically conveyed on trailers, trucks, dedicated wheeled devices, and even airplanes. Agricultural applications of pesticides, distribution of water, and collection of sewage are several examples of their applications, where the tank can be pulled by a tractor or on another piece of farm equipment, be mounted on a truck or are a component of framed pallet. These plastic tanks all share several common features. They are relatively inexpensive, relatively lightweight, and they don't rust. A problem with the tanks is that even though these tanks are translucent the opacity is relatively high, and it is difficult to determine the level of a substantially clear liquid contained therein, except by viewing an interior of the tank typically through an inlet/outlet mouth on top of the tank, and even then, it can be difficult to determine the depth of liquid. The level of the liquid is almost impossible to see from the exterior of the tank because the opacity of the tank is so high that it is very difficult to see the level of the liquid even in bright daylight, and impossible to see at night.

What is needed is a method and apparatus wherein the level of the liquid of the contents of a portable tank are readily visible from the outside of the tank, even tanks that have a relatively high opacity. The level is visible in the day or night, therein enabling a user to quickly and easily determine the quantity of liquid contained therein with out, having to remove a cap and peer in through the inlet/outlet mouth, or use a dip stick. Another issue that arises with portable tanks is that when it is dark, it can be very difficult to align a tank's spout with an opening of the fuel line of a receiving reservoir, for instance a reservoir on a tool, a vehicle or a heater. A consequence of misalignment is that spillage often occurs during transfer of the liquid. Spillage can be hazardous and has a negative environmental impact. What is further needed is a method and apparatus that reduces spillage.

SUMMARY OF THE INVENTION

An embodiment of the invention is an illuminable tank comprising a partially translucent tank having partially translucent side walls and an upper portion; and an illumination apparatus. Activation of the illumination apparatus is at the user's discretion, for instance to determine the level of liquid in the tank, to make the tank more visible at night, and to light the area surrounding the tank's mouth and a spout, if so equipped. The illumination apparatus does not change the flammability or contamination characteristics of the tank, so that if the tank is used to store, carry or dispense flammable fuel it can be illuminated without increasing the hazard of having a fire. If the tank is used to store, carry or dispense water it can be illuminated without increasing the hazard of contaminating the water. The illumination apparatus comprises an electrical circuit with a plurality of light emitting devices, where at least one first light emitting device is operatively mounted on the upper portion of the translucent tank. The first light emitting device is directed toward the interior of the tank, therein backlighting the tank and illuminating a visible level line at an interface of a surface of the liquid in the tank and the space above the surface.

There is also preferably at least one second light emitting device mounted proximate to a neck element for attaching a spout to the tank. The second-light emitting device is directed toward the spout, therein providing a cone of light for the spout. The illumination apparatus is preferably manually activated using a non-sparking enclosed switch in electrical communication with a compact portable electrical power source and the light emitting devices.

A portable electrical power source is enclosed in a spark proof, explosion proof compartment, which can be part of the tank or an element within the illumination apparatus. The illumination apparatus preferably also has one or more sensors that detect if a component of the circuit is overheated or otherwise operating in a less than normal manner. The sensors cause the illumination apparatus to automatically shut off if a problem, such as overheating, is detected.

BRIEF DESCRIPTION OF THE DRAWINGS

The foregoing and other objects will become readily apparent by referring to the following detailed description and the appended drawings in which.

DETAILED DESCRIPTION OF THE INVENTION

Figure 1:
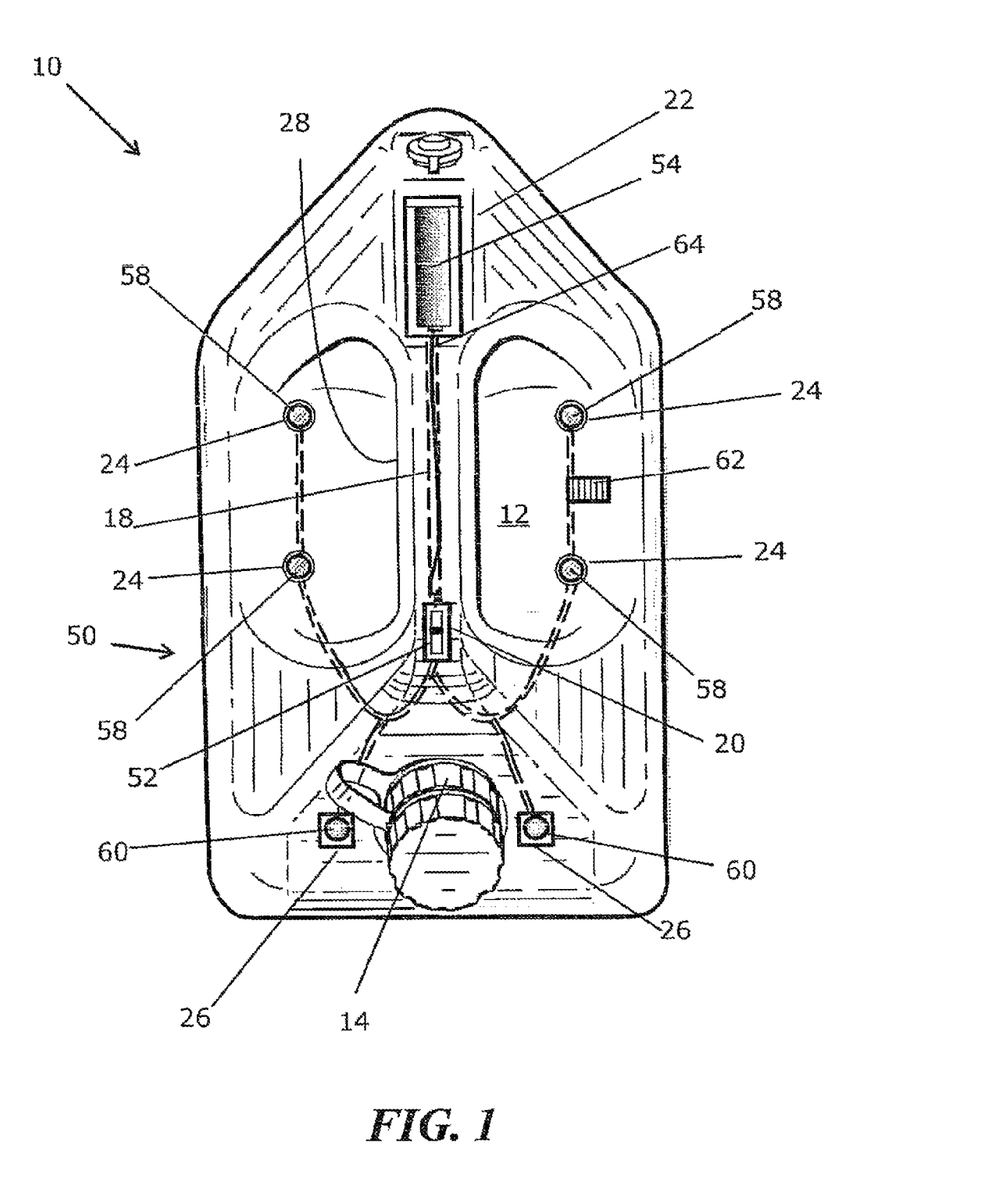
FIG. 1 is a planar top view of an embodiment of the illuminable plastic fuel tank fitted with an illumination apparatus that is an electrical circuit having a plurality of light emitting devices, where at least one first light emitting device backlights the interior of the tank making a level of the liquid within visible from the exterior side of the tank, and a second light emitting device that is positioned proximal to a neck element, such that the emitted light faces outward, illuminating the region around the spout.

The illuminable tank 10 as illustrated in FIG. 1 is a portable fuel tank. It is comprised of a partially translucent tank 12 having walls composed of a plastic material, typically a pigmented thermoplastic material, that are partially translucent. The partially translucent tank incorporates an illumination apparatus that is manually actuated. The illumination apparatus can be self-contained or built-into the portable fuel tank. In the illustrated built-into embodiment, the illumination apparatus comprises an electrical circuit with a plurality of light emitting devices, where at least one first light emitting device is mounted in a receptacle on the upper portion of the partially translucent tank. The first light emitting device is directed toward the interior of the tank, therein backlighting the tank and illuminating a visible level sine at an interface of a surface of the liquid in the tank and the space above the surface. There is also at least one second light emitting device mounted proximate to a neck element for attaching a spout to the tank. The second light emitting device is directed toward the spout, therein providing a cone of light for the spout. As can be seen the illumination apparatus is substantially incorporated into the upper portion of the tank. In the illustrated embodiment, individual first light emitting devices are located in individual light receptacles. As shown in the illustrated embodiment, a receptacle is substantially a recessed indentation, where the indentation preferably has a substantially clearer and possibly thinner wall. The receptacle with the first light emitting device is explosion proof. The first light emitting device is positioned such that its light provides light to the interior of the tank. The tank also has a mounting base proximate to the neck element that positions and secures the second light emitting device. The second emitted light provides a cone of light, which illuminates the region external to the tank and adjacent to the spout. The second emitted light is also explosion proof. The illuminable tank has a spark proof, explosion proof compartment 22 for the compact portable electrical power source 54. The power source preferably is low voltage, under 13 volts. As shown in FIG. 1, electrical power is conveyed over conductive elements 64 (i.e. wires) from the power source through a passage 18 in the handle to a sealable chamber 20 housing the non-sparking enclosed switch 52. The chamber is optimally located in the handle 28 on the tank 12. When the tank is fabricated, preferably a passage or conduit is provided in the upper portion, through which conductive elements 64 (i.e. wiring) are contained, as well as other components of the electrical circuit 50. (see FIGS. 4a, 4b). As shown, the passages in the tank also provide a built-in housing for sensors 62 for detecting if the circuit is overheated or otherwise operating in a less than normal manner. A main purpose of the sensors is to cause the electrical circuit to shut off if the circuit overheats. An example of such a sensor is a thermistor.

Figure 2:
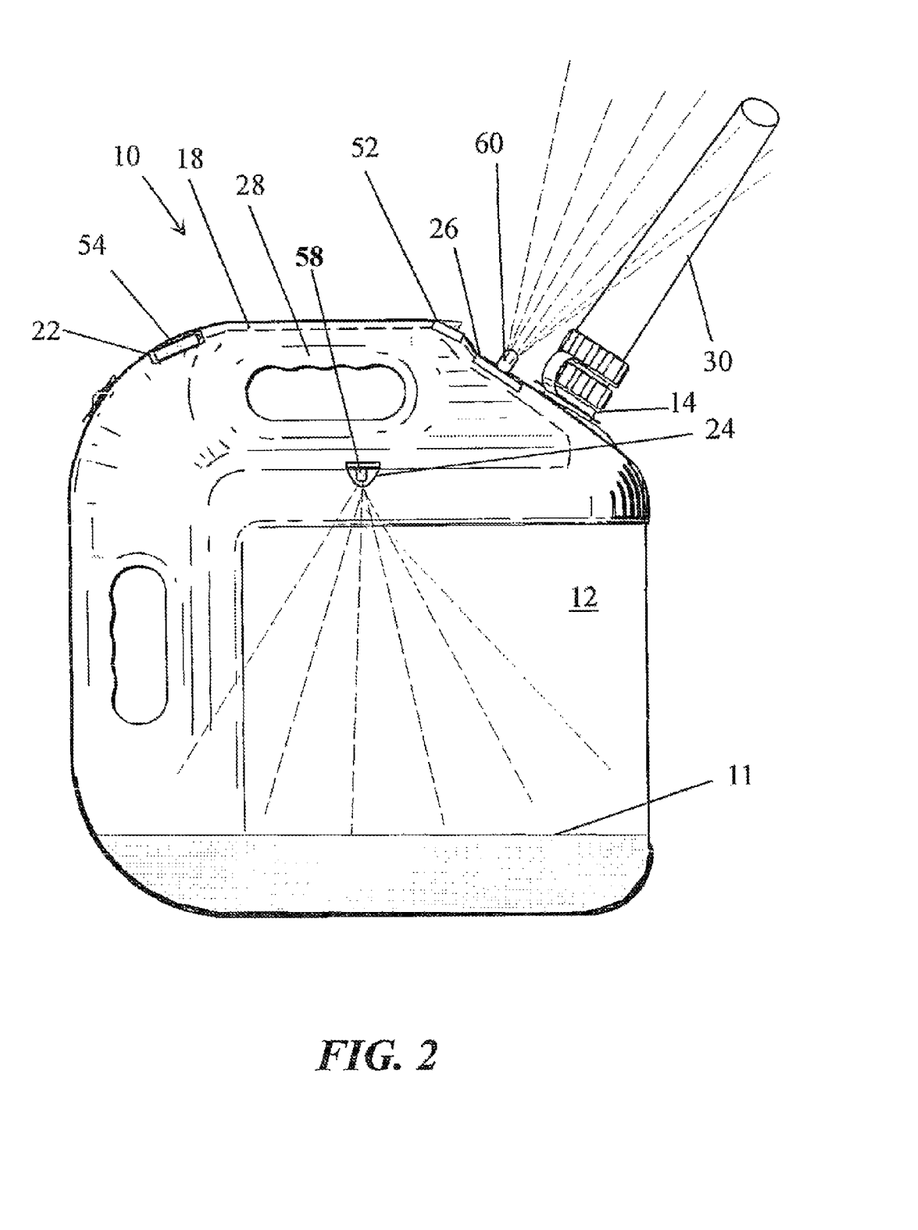
FIG. 2 is a planar side view of an illuminable tank.
Figure 4A:
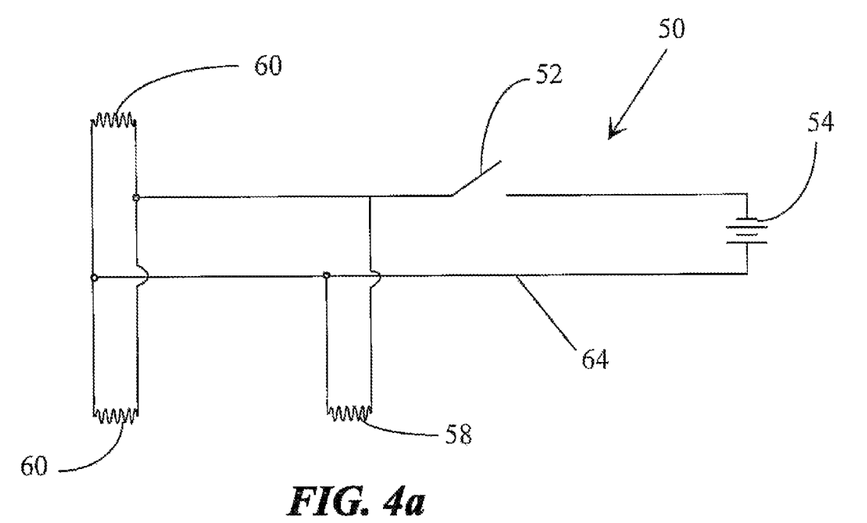
FIG. 4a is a diagrammatic view of an electrical circuit apparatus that can be fitted to a translucent tank.
Figure 4B:
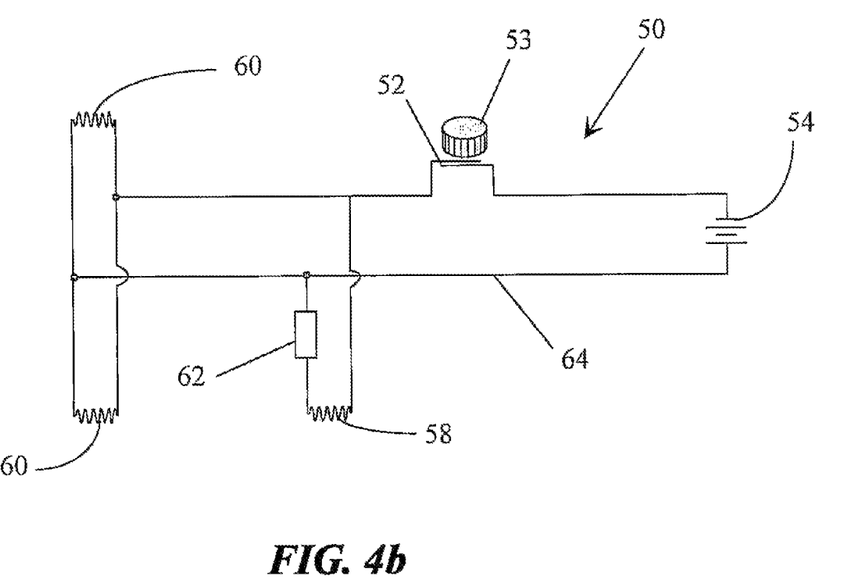
FIG. 4b is a diagrammatic view of an electrical circuit apparatus that has a magnetic reed switch, a permanent magnet, and a sensor, as well as the plurality of light emitting devices.

Most of the elements of the illumination apparatus 50 can be seen in the top view, and illustrated diagrammatically in FIGS. 4a and 4b. This is particularly so for the built-in illumination apparatus 50. The side view of the illuminable tank 10, as illustrated in FIG. 2 illustrates most of the elements of the partially translucent tank 12. Quickly recounting, the illumination apparatus 50 in the illustrated embodiment, includes a non-sparking enclosed switch 52 in electrical communication with a compact portable electrical power source 54 that is enclosed in a spark proof, explosion proof compartment 22. The preferred switch is a magnet reed switch that is comprised of a permanent magnet and a reed switch 52 with a permanent magnet 53. The reed switch contains two magnetizable and electrically conductive metal reeds which have end portions separated by a small gap when the switch is open. The reeds fare hermetically sealed in opposite ends of a tubular (usually glass) envelope. A magnetic field (from an electromagnet or a permanent magnet) causes the contacts to pull together, thus completing an electrical circuit. The stiffness of the reeds causes them to separate, and open the circuit, when the magnetic field ceases. The compact portable electrical power source 54 in the illustrated embodiment is a battery.

Switch 52 is in electrical communication with a plurality of light emitting devices 56. In the circuit in FIGS. 4a; 4b these devices are shown as resistors, and they will produce a small quantity of heat, but not enough to affect the plastic material or to ignite a flammable fuel. Examples of light emitting devices are low voltage sealed LED lamps, and the like. LED lamps are shown in the illustrated embodiment. They are resistant to solvent, require little power, have a long working life, and are energy efficient. The preferred light emitting devices provide white light. White light LED lamps are selected from the group consisting of a RGB LED lamp, a modified blue LED lamp that is typically a InGaN—GaN structure covered with a yellowish phosphor coating made of $Ce^{3+}$ YAG crystals, a near ultraviolet (NUV) emitting LED lamp coated with a mixture of europium-based red and blue emitting phosphors plus green emitting copper and aluminum doped zinc sulfide (ZnS:Cu, Al), a homoepitaxially grown zinc selenide on a ZnSe substrate LED lamp which simultaneously emits blue and yellow light, a blue LED coated with dots that glow white in response to blue light produced by the blue LED, and an organic LED (OLED) lamp.

In the illustrated embodiment shown in FIG. 1, there are four LED lamps, each in its own receptacle 24, and the LED lamps illuminate the interior of the tank. The number of LED lamps is selected to produce the desired level of illumination, and the LEDs are sufficiently dispersed such that there is not a buildup of heat. The number of LEDs will be somewhat dependent on the size of the tank, the wattage of the LED, and the lighting efficiency. In the illustrated embodiment, there are a pair of second light emitting devices 60, each LED lamp is mounted on a base 26 proximate to the tank neck element 14. The neck element 14 provides a threaded hollow stem for attaching a spout 30 to the translucent tank. When the spout is attached, as shown in FIG. 2, the second emitting devices 60 illuminates a region external to the tank and adjacent to the spout 30. There are as many second light emitting devices as needed to provide the proper illumination. The second emitting devices 60 are also explosion proof. The illumination apparatus 50 has a sensor 62, a thermistor, that detects if the circuit is overheated or otherwise operating in a less than normal manner. If the thermistor becomes hot, it shuts off the LEDs. The illumination apparatus 50, in its entirety, is explosion proof, and the illuminable plastic fuel tank can be used with all commercial retail fuels. The illumination apparatus 50 can be further comprised of timers, flashers, and audible devices that are actuated by the one or more sensors. These are not illustrated. The illuminable plastic tank and spout can be fitted informed with spark arresters, static straps and other grounding devices that drain off electrical charges. These are not illustrated.

The illuminable plastic fuel tank 10 illustrated in FIG. 2 provides a side view of the partially translucent tank 12. The translucent tank incorporates the illumination apparatus 50. The translucent tank in this embodiment has one receptacle 24 for the first light emitting device 58, in the upper portion of the tank. The illustrated receptacle 24 is a recessed indentation that is substantially a clear thin wall bulb. As shown, each receptacle receives and secures one LED lamp. In the illustrated embodiment only one LED lamp provides enough light to illuminate the interior of the tank. The translucent tank has a pair mounting bases 26 proximate to the neck element 14 for the pair of second light emitting devices 60. The pair of second light emitting devices 60 illuminate the region external the tank 12 and adjacent to the spout 30. Note, that in the illustrated embodiment there is no receptacle, yet the second light emitting devices 60 are LED lamps selected to be explosion-proof and resistant to weather. The illustrated translucent tank 12 has a built-in compartment 22 for the batteries 54. The preferred battery is a 9 volt, with male and female clips which attach to a wiring harness 64. The wiring 64 is illustrated in FIGS. 1, 4a, 4b and 5. The magnetic reed switch 52 is housed in a sealed chamber 20 (see FIG. 1). The sealable chamber 20 is molded into the top handle 28 on the tank 12. Shown in dashed lines is the passage 18 that provides the conduit for the wires 64 amongst the elements of the illumination apparatus 50. The passage 18 also provides a housing for the sensor.

In operation the light emitting devices are turned on and off via the magnetic reed switch, and power is provided by the portable electrical source, such as a battery enclosed in an explosion proof compartment, which may be vented. The lights serve to create an illuminated backlit tank. The backlit tank enables a user to see the liquid level 11 in the tank. The interior lighting imparts a luminescent quality to the entire plastic tank, such that it can be easily seen at great distances at night. This unexpected effect makes the use of the illuminable tank 10 much safer to use at night than a conventional non-illuminated tank, particularly in applications where one is attempting to start a disabled car on the edge or shoulder of the road. The polymeric materials used in plastic tanks are generally comprised of a translucent plastic, nominally a thermoplastic such as polyolefin, that is pigmented to the desired color, for instance red. The pigment lowers the translucence so that most tanks are only partially translucent. Also, the exterior surfaces of the tanks walls normally have a matte finish, which diffracts light incident to the outside surface of the tank, thus making the tank appear even more opaque. On the other hand, the interior surfaces of the tank's walls are relatively smooth, and operationally, light emanating from the interior is diffracted less, and reflected light substantially has no way to escape, except through one of the walls of the tank. Liquid contained in the tank reflects a portion of the light, and the reflected light augments the backlighting. The cumulative effect is that a relatively low intensity light is sufficient to illuminate the entire tank. The synergistic combination of a smooth interior tank surface and the backlighting enable low voltage, low power light emitting device, like an LED, to be suitable for providing illumination. The non-sparking switch and explosion proof battery compartment eliminate the possibility of accidental ignition of the fuel even if fuel spills on the non-sparking switch or explosion proof battery compartment.

The lights clustered around the neck element provide sufficient light on the spout and regions just beyond the spout so that at night a user can see that the spout is properly aligned with the mouth of a fuel reservoir for instance on a kerosene heater, a camping oil lamp, an outboard motor or a car that has run out of gas. In many cases, it is critical that no fuel actually touches certain parts of the equipment being fueled, as the equipment can still be very hot, hot enough to cause a fire. Kerosene, heaters are particularly problematic, as substantially the entire heater can be hot except for the actual reservoir for the kerosene. Also, cars and trucks present another set of problems at night. While a red gasoline tank is highly visible in the day, at night a red surface appears almost black, and a driver in another vehicle approaching a stalled car being refueled from a conventional plastic tank has a hard time seeing the non-illuminated conventional tank and the person. The passing car can cause spillage or even accidentally hit the fuel tank and/or the person holding the tank. The illumination apparatus makes it much easier to see the gas tank and the user. Furthermore, the user can reduce spillage, as he/she can align the spout with the mouth of the reservoir's fuel line, and the user can quickly tell at a glance how much fuel he/she has added. This later point is particularly important to people providing emergency roadside service to cars and, trucks, for by using the invented illuminable tank the user can determine whether they need to refill the plastic tank before going on a service call.

Figure 3:
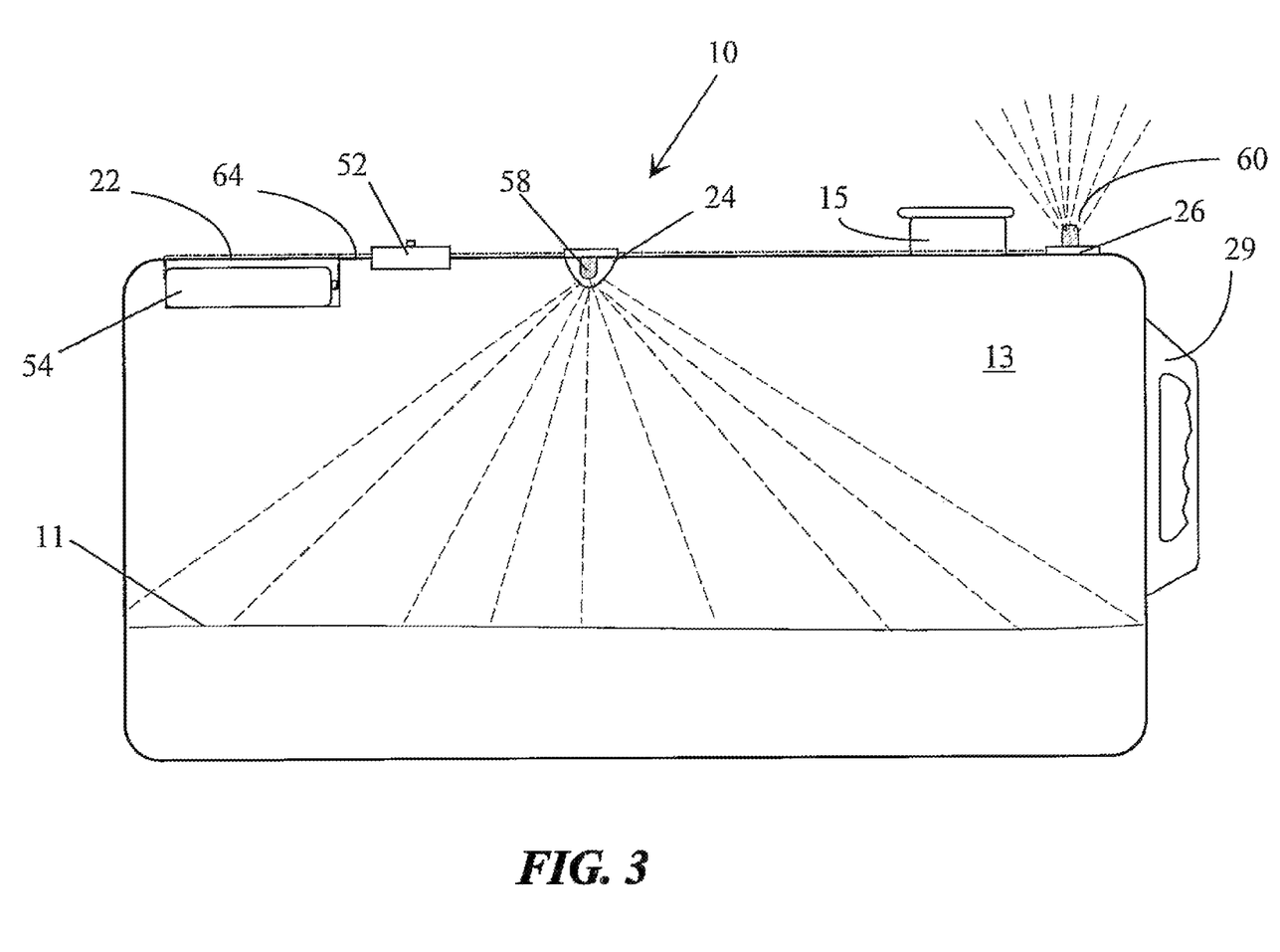
FIG. 3 is a planar side view of an invented illuminable plastic fuel tank that is substantially rectangular, and is typically used as a fuel tank on small boats.

In an alternate embodiment, the illuminable tank is a plastic illuminable tank for boats. The illuminable tank is typically about 10 gallons, but can be much larger depending on the application, and it is hidden under a deck near the transom of the boat. It is virtually impossible to tell how much fuel is in the tank without sliding the tank out, and inspecting the mouth of the tank. The illuminable tank has a substantially rectangular tank 13 for boats. The tank 13 is translucent and is fitted with the illumination apparatus, such that when illuminated, the level 11 of the liquid contents can be readily seen, and the volume can be determined. The illuminable tank has a handle 29.

In FIGS. 4a and 4b the diagrams are substantially self-explanatory. The illumination apparatus 50 has a pair of second light emitting devices 60 for illuminating the spout, and one first light emitting device 58 for illuminating the interior of the tank. The magnetic reed switch 52 is shown in FIG. 4b with a permanent magnet 53. The switch is sealed, and explosion proof. The power supply is 54, the wiring 64, and the sensor is 62.

Figure 5:
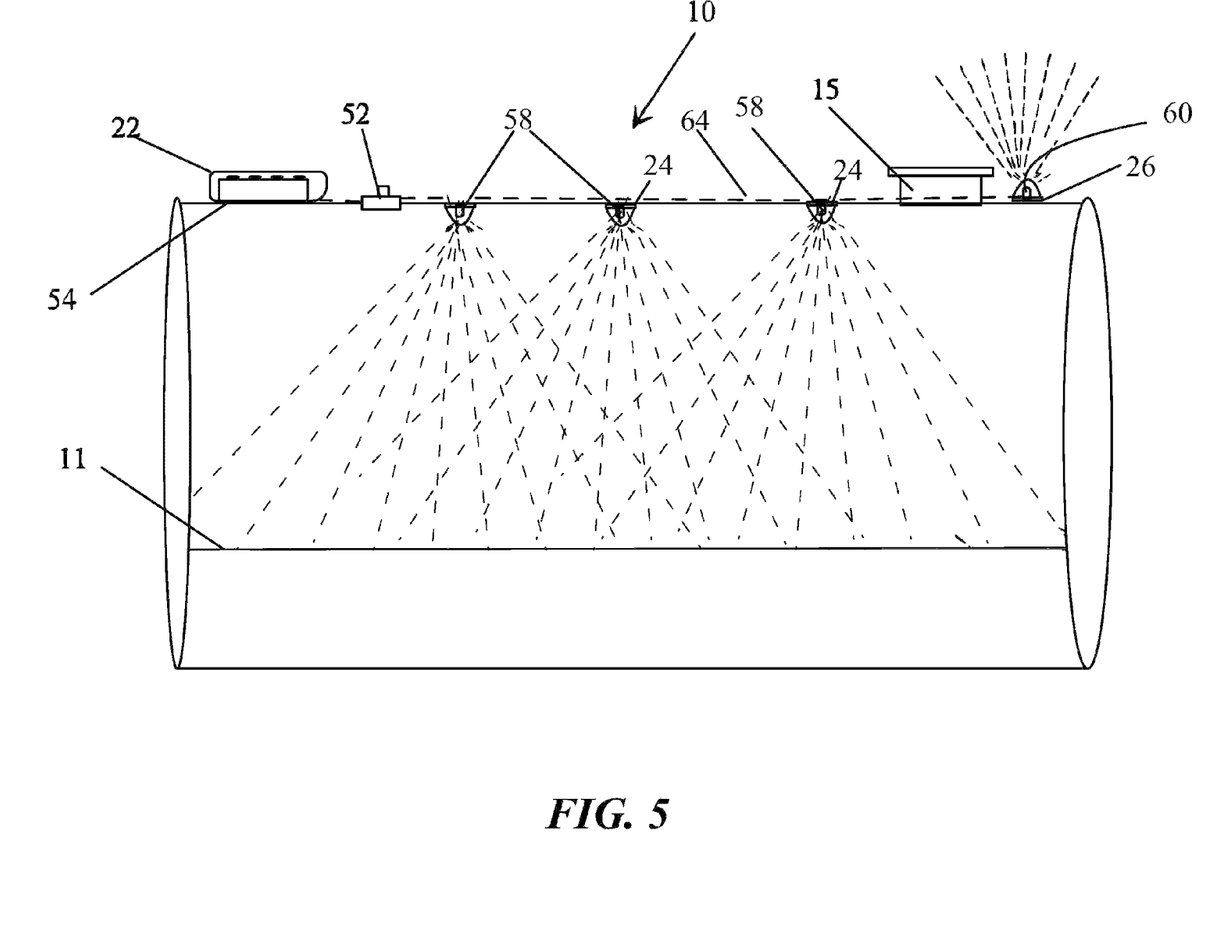
FIG. 5 is a planar side view of a large illuminable cylindrical tank.

In a second alternate embodiment, the illuminable tank is a large tank typically used in agricultural applications. The illuminable tank is large, usually greater than 100 gallons, used in the storage and distribution of liquids ranging from water to pesticides. The tanks are typically moved on trailers, trucks, and dedicated wheeled devices (not shown). These tanks normally are often composed of non-pigmented thermoplastic material, and the liquid contained therein is often clear. Over time the tanks become more opaque as the sun oxidizes the outside surface of the tank and there is spillage and deposition of salts. FIG. 5 illustrates the large illuminable tank that is substantially cylindrical.

Figure 6:
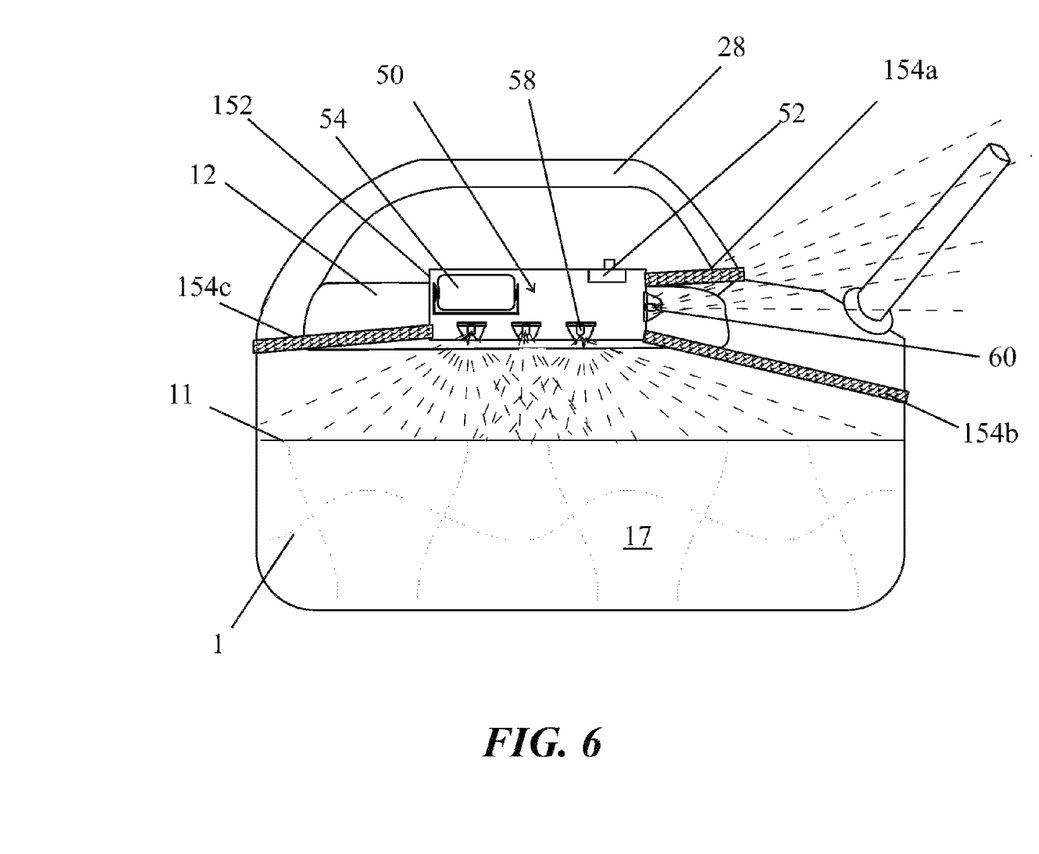
FIG. 6 is a diagrammatic side view illustrating a self-contained illumination apparatus having a fastening mechanism to attach the illumination apparatus to an upper portion of a generic tank.
Figure 7:
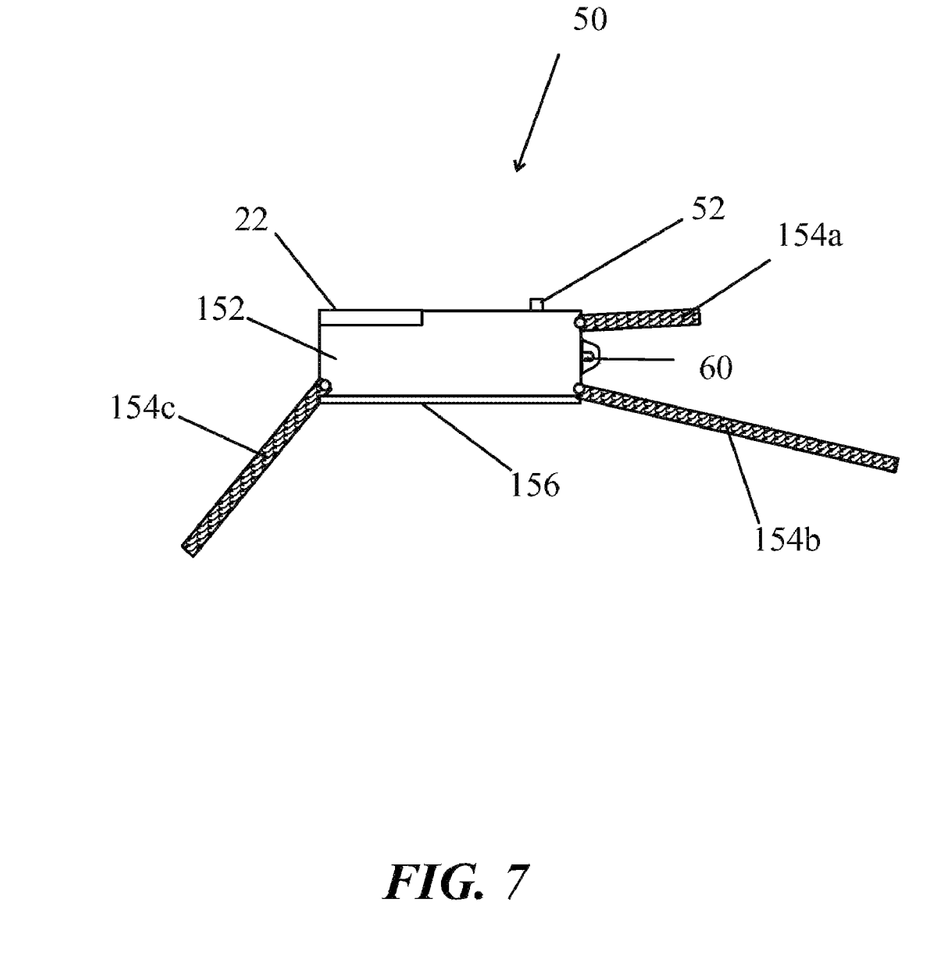
FIG. 7 is a side view of an embodiment of the self-contained illumination apparatus unit having a fastening mechanism illustrated diagrammatically in FIG. 6.

A diagrammatic side view of an illumination apparatus 50 assimilated to further include a fastening mechanism to attach the illumination apparatus to a generic tank 17 is illustrated in FIG. 6. The assimilated illumination apparatus 50 is a substantially self-contained radiant unit 152, uniquely configured to quickly mount to an exterior surface of the upper portion 12 of the generic tank 17. The illustrated fastening mechanism comprises straps 154*a*, 154*b*, 154*c* that position the unit 50 such that the first light emitting device(s) 58 are individually oriented to radiate their light toward the interior of the tank when the case is mounted on a tank, backlighting the tank and illuminating a visible level line 11 at an interface of a surface of the liquid 1 and the space above the surface. The fastening mechanism can alternately be selected from pressure sensitive tapes, adhesives, hook and loop systems, elastic and mechanical bands, snaps, clips, and the like to attach the illumination apparatus unit to various shaped tanks. As is evident from the illustration, the fastening mechanism can utilize multiple portions of the tank to affect a proper mount, including the sides and the handle, as well as the upper surface. The illumination apparatus unit 152 comprises an explosion proof compartment 22, as shown in FIG. 7, for a portable electrical power source 54, and a switch 52. The unit 152 has a protective case that in addition to housing the illumination apparatus components, can potentially serve as a heat sink for the first light emitting devices 58 and any other electrical heat-generating components.

In the illustrated embodiment, the illumination apparatus also has a second light emitting device 60, which provides light for the exterior of the tank, and is directed toward the spout therein providing a cone of light for the spout. The electric circuitry connecting the components is not shown in this Figure, but is described and illustrated in FIGS. 4*a* and 4*b*. The second light emitting device 60 is also preferably an LED lamp that provides white light.

FIG. 7 is a side view of the self-contained illumination apparatus unit illustrated in FIG. 6. Note, the first light emitting devices 58 are not visible as they are recessed in the protective case of the unit. The illustrated embodiment has a perimeter seal 156 for affecting a flush fit with the tank, wherein light produced by the first light emitting devices 58 is directed toward the tank, and preferably from an upper portion of the tank. The perimeter seal 156 would operatively perform similar to a gasket, enabling the self-contained illumination apparatus unit to, mate with the exterior surface of the tank, which frequently has a matte or mottled finish. In the illustration, the switch 52 is turned off, and no light is being generated. The second light emitting device 60 can be recessed for protection, but it is not a functional condition of operability, and therefore the second light emitting device 60 is shown to illustrate its orientation. The straps 154*a*, 154*b*, 154*c* are braded to the case housing the illumination apparatus, and their angles with respect to the unit 152, as well as their lengths, are adjustable.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function, it is intended that such claim be construed to cover the corresponding structure, material, or acts described in the specification and equivalents thereof, including both structural, equivalents and equivalent structures.

What is claimed is:

1. An illuminable tank, said tank comprising: a partially translucent fuel tank, said partially translucent fuel tank having a relatively high opacity with translucent side walls and an upper portion; and an illumination apparatus comprised of an electrical circuit with a plurality of light emitting devices, where at least one first light emitting device is mounted in a receptacle on the upper portion of the partially translucent fuel tank, said first light emitting device directed toward an interior of the fuel tank, therein lighting the interior of the fuel tank, backlighting the partially translucent fuel tank, and illuminating the side walls and a visible level line at an interface of a surface of a liquid in the partially translucent fuel tank and a space above the surface; at least one second light emitting device mounted proximate to a neck element for attaching a spout to the tank, said second light emitting device directed toward the spout, therein providing a cone of light for the spout; a manual activation component that is a non-sparking enclosed switch; and a compact portable electrical power source that is enclosed in a spark proof, explosion proof compartment.

2. The illuminable tank according to claim 1, wherein said partially translucent side walls and an upper portion are composed of a plastic material.

3. The illuminable tank according to claim 2, wherein said plastic material is chemically resistant to water and fuel.

4. The illuminable tank according to claim 1, wherein said translucent fuel tank is portable.

5. The illuminable tank according to claim 1, wherein said non-sparking enclosed switch is a magnetic reed switch.

6. The illuminable tank according to claim 3, wherein said plurality of light emitting devices are white light LED lamps.

7. The illuminable tank according to claim 6, wherein said white light LED lamps are selected from the group consisting of a ROB LED lamp, a modified blue LED lamp that is typically a InGaN—GaN structure covered with a yellowish phosphor coating made of $Ce^{3+}$ YAG crystals, a near ultraviolet (NUV) emitting LED lamp coated with a mixture of europium-based red and blue emitting phosphors plus green emitting copper and aluminum doped zinc sulfide (ZnS:Cu, Al), a homoepitaxially grown zinc selenide on a ZnSe substrate LED lamp which simultaneously emits blue and yellow light, a blue LED lamp coated with dots that glow white in response to blue light produced by the blue LED, and an organic LED (OLED) lamp.

8. The illuminable tank according to claim 1, wherein said electrical circuit is substantially sealed in the upper portion of the translucent tank container.

9. The illuminable tank according to claim 1 further comprising a sensor that turns off the electrical circuit if a component of the electrical circuit overheats.

10. The illuminable tank according to claim 9, wherein said sensor is a thermistor.

11. The illuminable tank according to claim 9, wherein the sensor actuates a device selected from the group consisting of a timer device, a flasher device, an audible device and combinations thereof.

12. The illuminable tank according to claim 1 further comprising a grounding device that drains off electrical charges.

13. An illumination apparatus, said apparatus comprising: an electrical circuit that is fitted to a partially translucent plastic fuel tank, where the partially translucent fuel tank has a relatively high opacity, comprising a non-sparking switch in electrical communication with a compact portable electrical power source, and a plurality of light emitting devices comprised of at least one first light emitting device and at least one second light emitting device, said at least one first light emitting device being non-sparking and suitably resistant to solvent for mounting the at least one first light emitting device on an upper portion of the plastic fuel tank, such that the emitted light illuminates an interior of the partially translucent plastic fuel tank, therein backlighting the partially translucent plastic fuel tank and illuminating the side walls and a visible level line at an interface of a surface of a liquid in the fuel tank and a space above the surface, and at least one second light emitting device mounted adjacent to a neck element for fastening a dispensing spout, such that a region around the spout is lighted; and an explosion proof compartment that encloses the compact portable electrical power source.

14. The illumination apparatus according to claim 13 further comprising a sensor for detecting if a component of the electrical circuit is overheated, whereupon said illumination apparatus is turned off.

15. The illumination apparatus according to claim 14, wherein said sensor is a thermistor.

16. An illuminable plastic fuel tank, said tank comprising: a partially translucent fuel tank, where the partially translucent fuel tank has a relatively high opacity, having translucent side walls and an upper portion composed of a pigmented thermoplastic colored material; and an illumination apparatus comprised of an electrical circuit with a plurality of light emitting devices, where at least one first light emitting device is mounted in a receptacle on the upper portion of the fuel tank, said first light emitting device directed toward an interior of the fuel tank, therein backlighting the partially translucent fuel tank and illuminating the side walls and a visible level line at an interface of a surface of a liquid in the fuel tank and a space above the surface; a compact portable electrical power source that is enclosed in a spark proof, explosion proof compartment; and a manual activation component that is a non-sparking enclosed switch.

17. The illuminable plastic fuel tank according to claim 16 further comprising:
   at least one second light emitting device mounted proximate to a neck element for attaching a spout to the tank, said second light emitting device directed toward the spout, therein providing a cone of light for the spout.

* * * * *